United States Patent
Bahirat et al.

(10) Patent No.: US 10,949,120 B2
(45) Date of Patent: Mar. 16, 2021

(54) HOST DEFINED BANDWIDTH ALLOCATION FOR SSD TASKS

(71) Applicant: Intel Corporation, Santa Clara, CA (US)

(72) Inventors: Shirish Bahirat, Longmont, CO (US); John Rudelic, Folsom, CA (US); Mary Goodman, Sacramento, CA (US); Michael Allison, Longmont, CO (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 16/278,819

(22) Filed: Feb. 19, 2019

(65) Prior Publication Data

US 2019/0179570 A1    Jun. 13, 2019

(51) Int. Cl.
*G06F 3/06* (2006.01)

(52) U.S. Cl.
CPC ............ *G06F 3/0659* (2013.01); *G06F 3/061* (2013.01); *G06F 3/064* (2013.01); *G06F 3/0679* (2013.01)

(58) Field of Classification Search
CPC ...... G06F 3/0604; G06F 3/061; G06F 3/0629; G06F 3/064; G06F 3/0643; G06F 3/0644; G06F 3/0659; G06F 3/0665; G06F 3/0679
USPC .......................... 711/103, 154, 170, 202, 203
See application file for complete search history.

(56) References Cited

U.S. PATENT DOCUMENTS

| | | | |
|---|---|---|---|
| 2017/0262365 A1* | 9/2017 | Kanno | G06F 3/0619 |
| 2019/0042150 A1* | 2/2019 | Wells | G06F 3/061 |
| 2019/0114257 A1* | 4/2019 | Lin | G06F 3/0614 |
| 2020/0104056 A1* | 4/2020 | Benisty | G06F 3/0679 |

OTHER PUBLICATIONS

"Open-Channel Solid State Drives Specification, Revision 2.0", Light NVM. Jan. 29, 2018, 29 pages.

* cited by examiner

*Primary Examiner* — Gary J Portka
(74) *Attorney, Agent, or Firm* — Jordan IP Law, LLC (57) ABSTRACT

An embodiment of a semiconductor apparatus may include technology to provide placement option information to a host in response to a host query, and create a namespace to access a persistent storage media based on host-provided isolation granularity information. Other embodiments are disclosed and claimed.

14 Claims, 9 Drawing Sheets

|   |                        | Endurance Group | Set – physical isolation | Namespace Management | Namespaces | Shared Namespaces | Async Namespace Access | IO Determinism | Append only streams | Read Recovery Levels | Zones | Extendable Zones | Traditional Streams |
|---|------------------------|:---:|:---:|:---:|:---:|:---:|:---:|:---:|:---:|:---:|:---:|:---:|:---:|
| 1 | Endurance Group        | ▨ | ▨ | ▨ |   |   |   | ▨ |   | ▨ |   |   | ▨ |
| 2 | Set – physical isolation | ▨ | ▨ | ▨ |   |   |   | ▨ |   | ▨ |   |   | ▨ |
| 3 | Namespace Management   | ▨ | ▨ | ▨ |   |   |   | ▨ |   |   |   |   |   |
| 4 | Namespaces             | ▨ | ▨ |   | ▨ |   |   | ▨ |   |   |   |   |   |
| 5 | Shared Namespaces      |   |   |   |   | ▨ |   |   |   |   |   |   |   |
| 6 | Async Namespace Access |   |   |   |   |   | ▨ |   |   |   |   |   |   |
| 7 | IO Determinism         | ▨ | ▨ | ▨ | ▨ |   |   | ▨ |   | ▨ |   |   | ▨ |
| 8 | Append only streams    |   |   |   |   |   |   |   | ▨ |   | ▨ |   | ▨ |
| 9 | Read Recovery Levels   | ▨ | ▨ |   |   |   |   | ▨ |   | ▨ |   |   |   |
| 10 | Zones                 |   |   |   |   |   |   |   | ▨ |   | ▨ | ▨ | ▨ |
| 11 | Extendable Zones      |   |   |   |   |   |   |   |   |   | ▨ | ▨ |   |
| 12 | Traditional Streams   | ▨ | ▨ |   |   |   |   | ▨ | ▨ |   |   |   | ▨ |

Dependency Overlap

HOST DEFINED BANDWIDTH ALLOCATION FOR SSD TASKS

TECHNICAL FIELD

Embodiments generally relate to storage systems. More particularly, embodiments relate to host defined bandwidth allocation for solid state drive (SSD) tasks.

BACKGROUND

An SSD may include non-volatile memory (NVM) technology. Access to the contents of the SSD may be supported with a protocol such as NVM EXPRESS (NVMe), Revision 1.3, published May 2017 (nvmexpress.org). The Open-Channel Solid State Drives (OCSSD) specification, Revision 2.0, published Jan. 29, 2018 (http://lightnvm.io) describes a physical page addressing command set extension to the NVMe specification.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
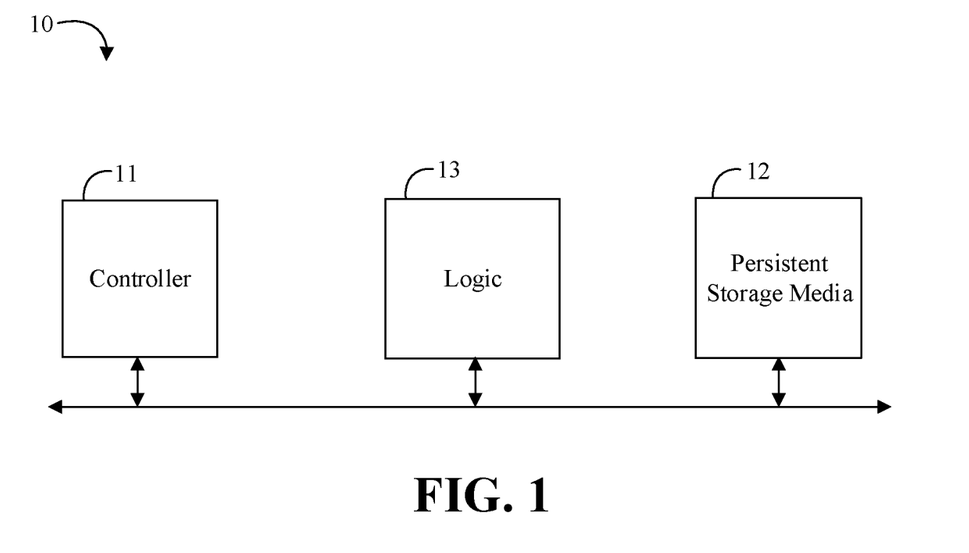
FIG. 1 is a block diagram of an example of an electronic storage system according to an embodiment.

Turning now to FIG. 1, an embodiment of an electronic storage system 10 may include persistent storage media 12, a controller 11 communicatively coupled to the persistent storage media 12, and logic 13 communicatively coupled to the controller 11 to provide placement option information to a host in response to a host query, and create a namespace to access the persistent storage media 12 based on host-provided isolation granularity information. For example, the host-provided isolation granularity information may correspond to one of channel, die, or band isolation information. In some embodiments, the logic 13 may be further configured to communicate data placement information to the host, set an indirection mode based on host-provided indirection granularity information for the namespace, communicate invalidity information to the host, and/or communicate defragmentation bandwidth requirement information to the host. In any of the embodiments herein, the persistent storage media 12 may comprise NAND media. In some embodiments, the logic 13 may be located in, or co-located with, various components, including the controller 11 (e.g., on a same die).

Embodiments of each of the above controller 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a storage controller, a storage manager, a memory controller, a micro-controller, a general purpose processor, a special purpose processor, a central processor unit (CPU), etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, or other system memory may store a set of instructions which when executed by the controller 11 cause the system 10 to implement one or more components, features, or aspects of the system 10 (e.g., the logic 13, providing the placement option information to the host in response to the host query, creating the namespace to access the persistent storage media 12 based on the host-provided isolation granularity information, etc.).

Figure 2:
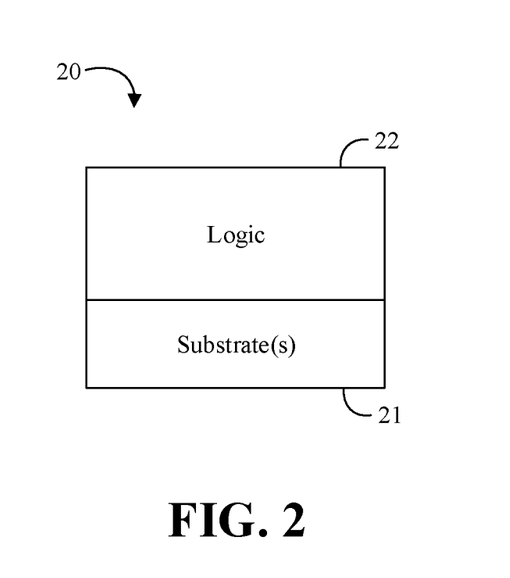
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to provide placement option information to a host in response to a host query, and create a namespace to access a persistent storage media based on host-provided isolation granularity information. For example, the host-provided isolation granularity information may correspond to one of channel, die, or band isolation information. In some embodiments, the logic 22 may be further configured to communicate data placement information to the host, set an indirection mode based on host-provided indirection granularity information for the namespace, communicate invalidity information to the host, and/or communicate defragmentation bandwidth requirement information to the host. In any of the embodiments herein, the persistent storage media may comprise NAND media. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
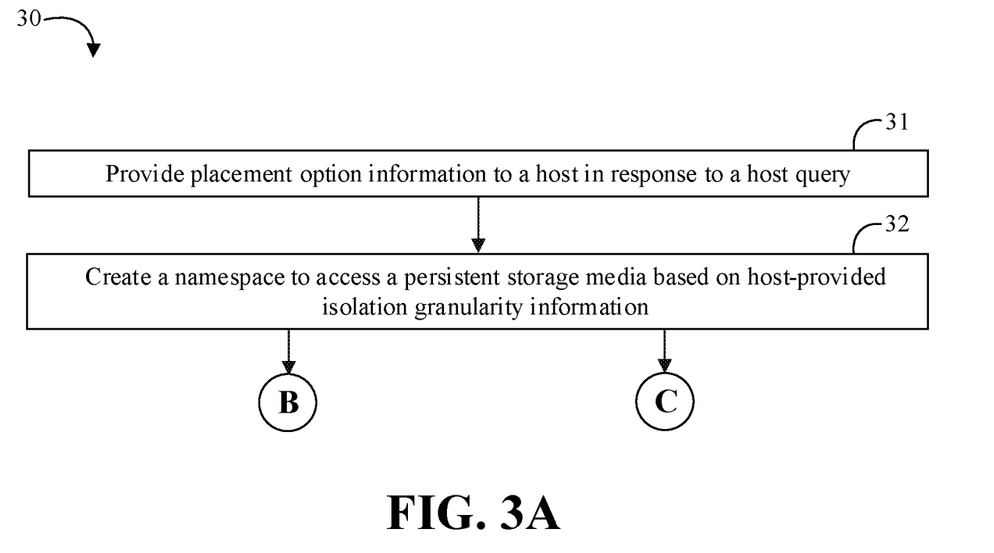
FIGS. 3A to 3C are flowcharts of an example of a method of managing storage according to an embodiment.
Figure 3B:
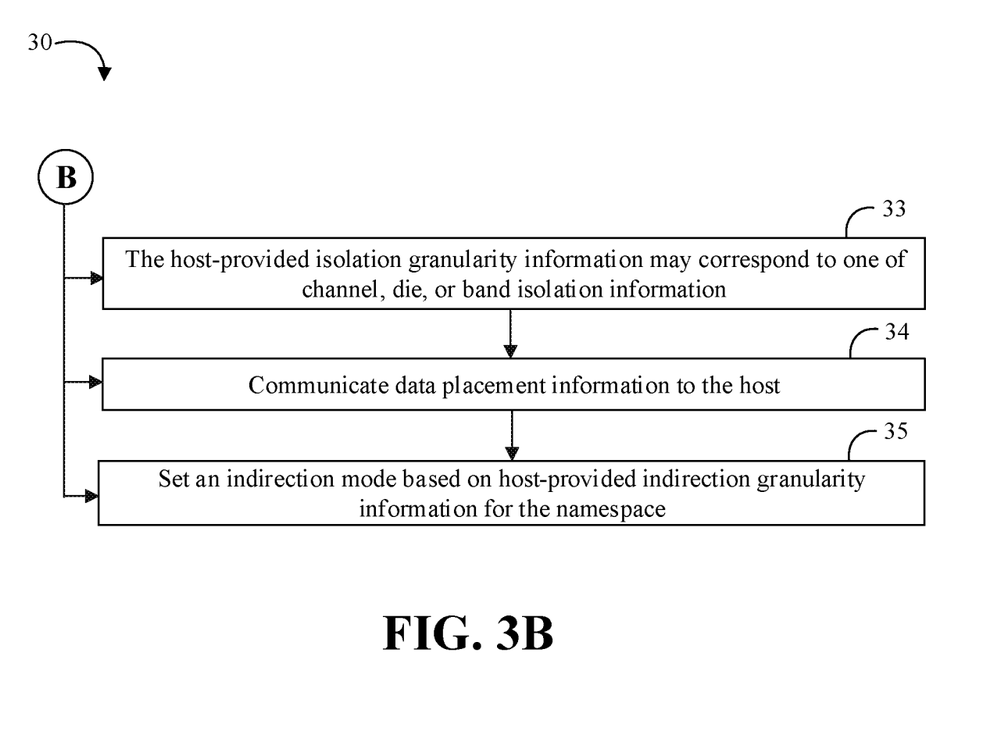
Figure 3C:
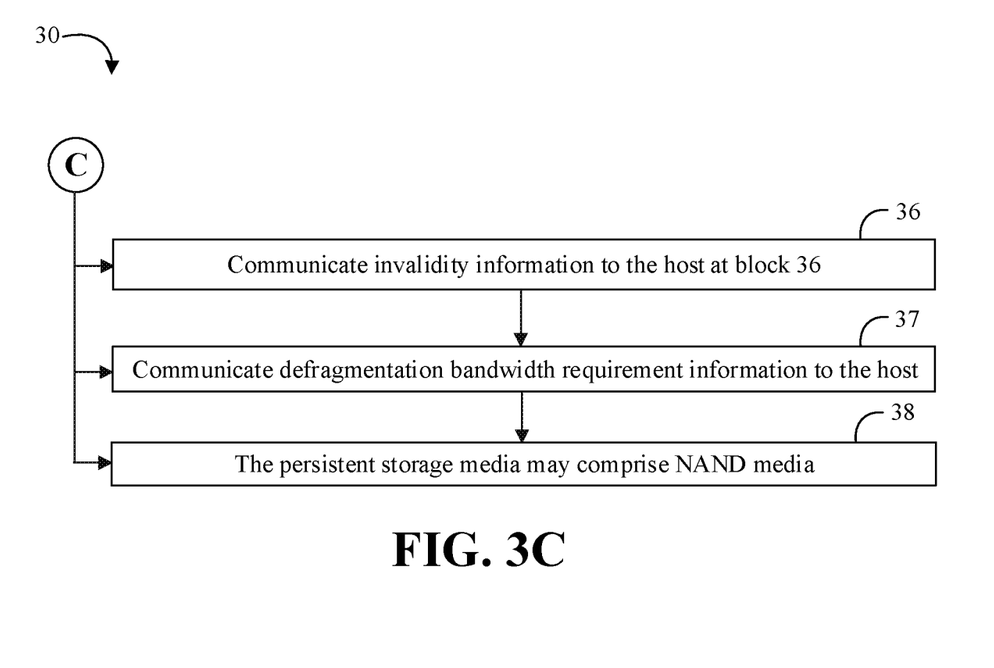

Turning now to FIGS. 3A to 3C, an embodiment of a method 30 of managing storage may include providing placement option information to a host in response to a host query at block 31, and creating a namespace to access a persistent storage media based on host-provided isolation granularity information at block 32. For example, the host-provided isolation granularity information may correspond to one of channel, die, or band isolation information at block 33. Some embodiments of the method 30 may further include communicating data placement information to the host at block 34, setting an indirection mode based on host-provided indirection granularity information for the namespace at block 35, communicating invalidity information to the host at block 36, and/or communicating defragmentation bandwidth requirement information to the host at block 37. In any of the embodiments herein, the persistent storage media may comprise NAND media at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 23 to 29 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide advanced data management, including host defined NAND channel bandwidth allocation for garbage collection, media management tasks and data placement selection. Some embodiments may overcome problems with architectural convergence. For example, in conventional SSDs, a variety of technologies may address various problems in a SSD with significant overlap and focus on addressing part of problems such as quality of service (QoS) and endurance management. For example, NVMe Sets, IO determinism controls, and direct placement are examples of technologies which address QoS and/or endurance management.

IO determinism puts the drive in a deterministic mode, but does not allow any garbage collection or media management tasks. IO determinism is an add on feature for NVMe Sets. The NVMe Sets minimize noisy neighborhood effects. However, these features utilize the SSD capability in a binary mode (e.g., all or nothing) and cannot work on standalone basis.

With real life varying workloads, predicting the time that gets allocated to the deterministic mode may be difficult. A random workload will need more defragmentation (defrag). A sequential workload will not need much defrag. A mixed workload will have different timing. After the drive is put in a non-deterministic mode, defrag may not consume back end bandwidth optimally.

Direct placement incurs a host overhead of maintaining table mappings and file translation layer (FTL) algorithms at a CPU level, which drops CPU bandwidth for application use. Some customers are optimistic about open channel while others are waiting for industry adoption.

In practice, the technology to manage a SSD is far more advanced and complex than simply knowing the workload types. Some end users may prefer to solve various SSDs problem in their own way. Various feature sets may address some SSD problems in a top down manner. For example, zones, streams, namespaces, sets, endurance groups, open channel (e.g., OCSSD), and number of other technologies may focus on reducing or minimizing write amplification and improving QoS. Many of these solutions overlap and work in orthogonal fashion with respect to each other.

Figure 4:
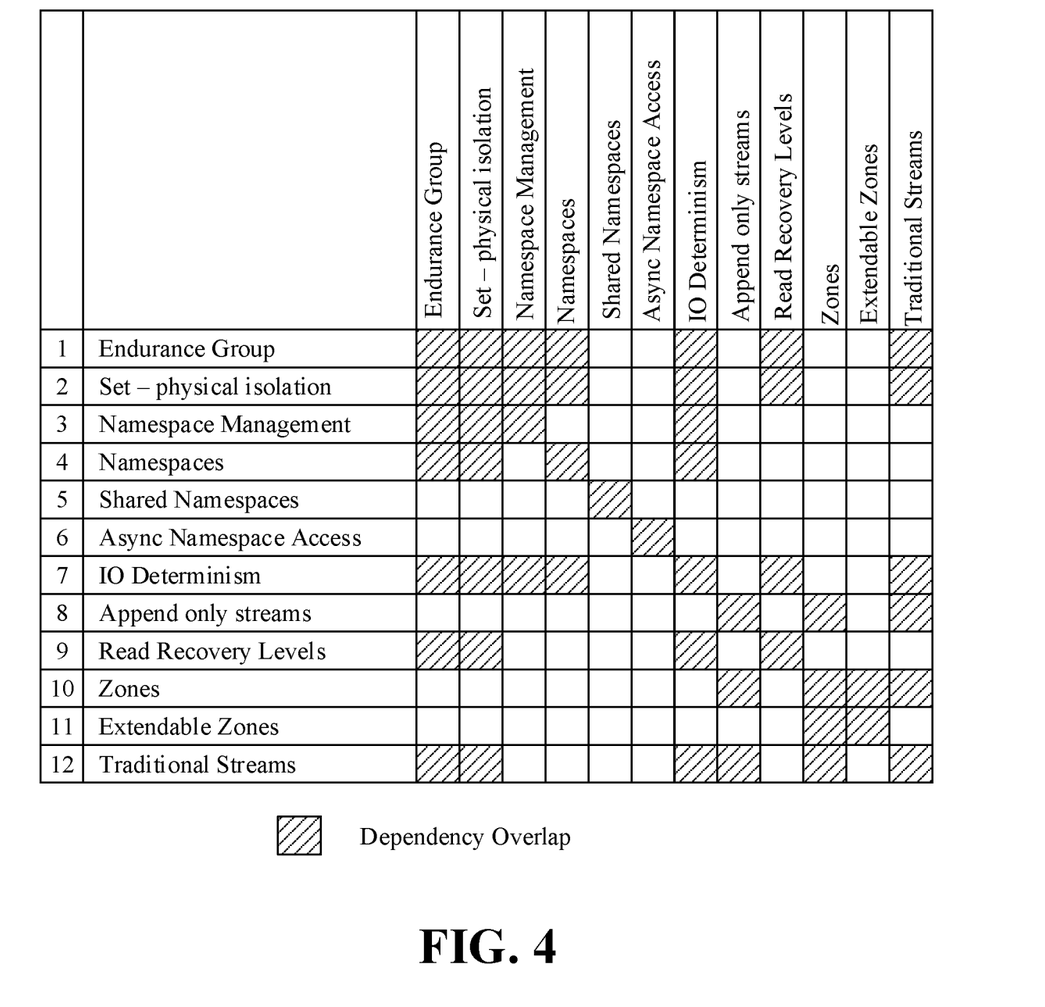
FIG. 4 is an illustrative table of examples of various SSD management features according to an embodiment.

Turning now to FIG. 4, an illustrative table shows various SSD management features related to the guarantee of SSD QoS and maximizing SSD endurance, with dependency overlap between the various features indicated by a cross hatch pattern in the table entry. As shown in FIG. 4, there may be significant overlap between a number of features. Changing attributes in one feature may impact another feature. For example, Endurance Group is a function of sets, namespaces may be related to IO Determinism, and so on. Some other technologies may require the host to be either fully responsible for controlling drive behavior (e.g., OCSSD: the host physically places the data to the die, Set: the host physically places data to the channel, etc.) or may fully isolate the data placement to the SSD. A problem with the open channel technology is the complexity and increased host CPU resource utilization required to manage data placement and NAND media management. A problem with the isolated SSD technology is the dependence for the host to physically place data within the available NAND die topology that may result in unpredictable performance. The various features identified in FIG. 4 address various specific problems, but may not be flexible enough to address other problems or a wide variety of concurrent, competing needs (e.g., Customer A: looking for Sets, Customer B: looking for stream, Customer C: looking for FTL lite, Customer D: looking for streams, etc.).

Advantageously, some embodiments may provide a single and simple solution to address one or more of the above problems. For example, some embodiments may provide an option to run the FTL either at the host or the device level, advantageously providing flexibility to control data placement and defrag by the host. In particular, some embodiments may provide technology to control defrag and media management tasks by allowing a host to control back end bandwidth to media management tasks. Some embodiments may also include technology to enable the device and the host to exchange information that enables an intelligent decision making process about defrag and host bandwidth allocation that can guarantee device performance at all levels. Some other systems may provide various NAND management features where the FTL is maintained at the host level (e.g., focusing on media management). In contrast, some embodiments may enable executing the FTL at the device or the host level and may focus on data management.

Figure 5:
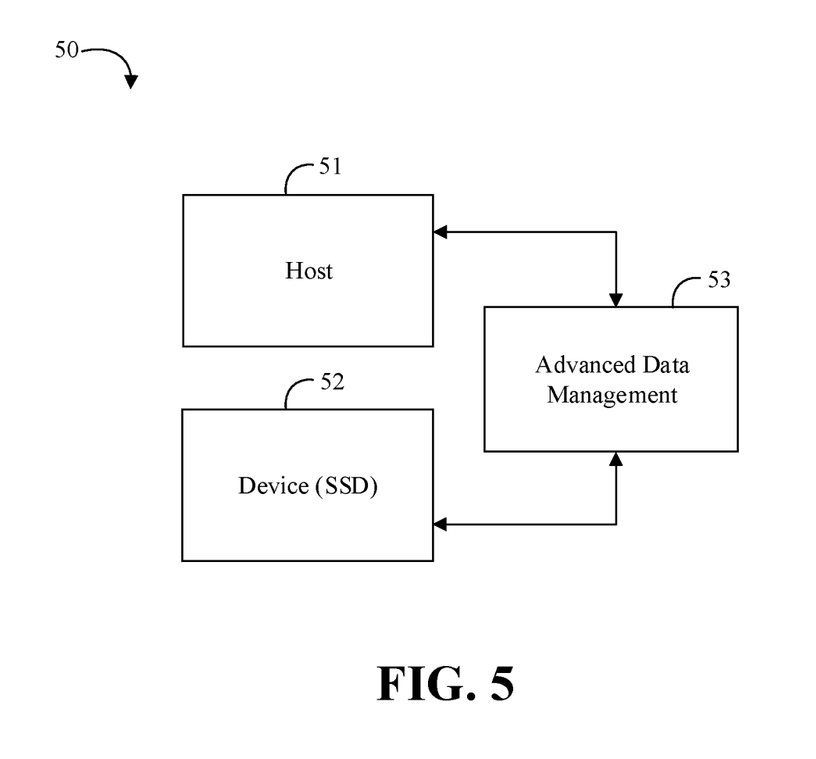
FIG. 5 is a block diagram of an example of an electronic processing system apparatus according to an embodiment.

Turning now to FIG. 5, an embodiment of an electronic processing system 50 may include a host 51, a storage device 52 (e.g., a SSD), and an advanced data management 53 module communicatively coupled between the host 51 and the device 52. In some embodiments, the advanced data management 53 may provide a device 52 to host 51 communication channel for advanced data management including, for example, 1) Invalidity rates over time; 2) Optimum data placement options based on: a) read requirements, b) write requirements, c) data life span, and/or d) isolation requirements; and/or 3) Bandwidth allocation for: a) the host, b) defrag, and/or c) media management.

Advantageously, some embodiments may provide a FTL implementation that is transparent to the host. Some embodiments may include technology that allows the host to place data in a namespace physically by specifying an isolation granularity (e.g., based on application requirements). The host may query available placement options by using a log page. The host may then select either a channel, die or band isolation. The storage device may communicate data placement details back to the host. In some embodiments, the host may specify the indirection granularity in the above namespace (e.g., die level indirection, band level indirection, 4K indirection, 64K indirection, etc.). In some embodiments, the device may communicate invalidity and defrag bandwidth requirements to the host. The host may utilize the data from the device to optimize data placement and allocate specific bandwidth for defrag. The device may then throttle host input/output (I/O) and defrag at the host-defined bandwidth level.

Some embodiments may advantageously eliminate a need for the host to maintain the full FTL. Some embodiments may also eliminate a need or dependence on a combination of multiple features to meet a specific need. Some embodiments may provide technology for the host to directly control data placement and defrag to achieve different system level requirements. Some embodiments may enable the host to focus on optimizing data placement rather than managing the entire SSD. Some embodiments may include technology that allows the device to guide the host to make optimal data placement decisions. Some embodiments may also maintain the ability of a SSD to take advantage of the benefit of a number of other technologies such as Zoned Namespace and Open Channel. In some embodiments, the host does not have to choose direct placement but may defer the choice to the device and the device will provide the placement information to the host. If needed, the host may maintain a small mapping table or query information to the host. Some embodiments may advantageously create a transport system that still allows a SSD and the host to provide further innovation using their own respective strengths.

As discussed above, some embodiments may be compatible with the technical capabilities of an Open-Channel SSD to provide a host manageable FTL. This enables the host to perfectly place data for QoS, Endurance, Write Amplification (WA) and data isolation benefits. Additionally, some embodiments do not require the host to maintain the full FTL, however, advantageously providing a benefit to manage data placement and bandwidth allocation.

Figure 6:
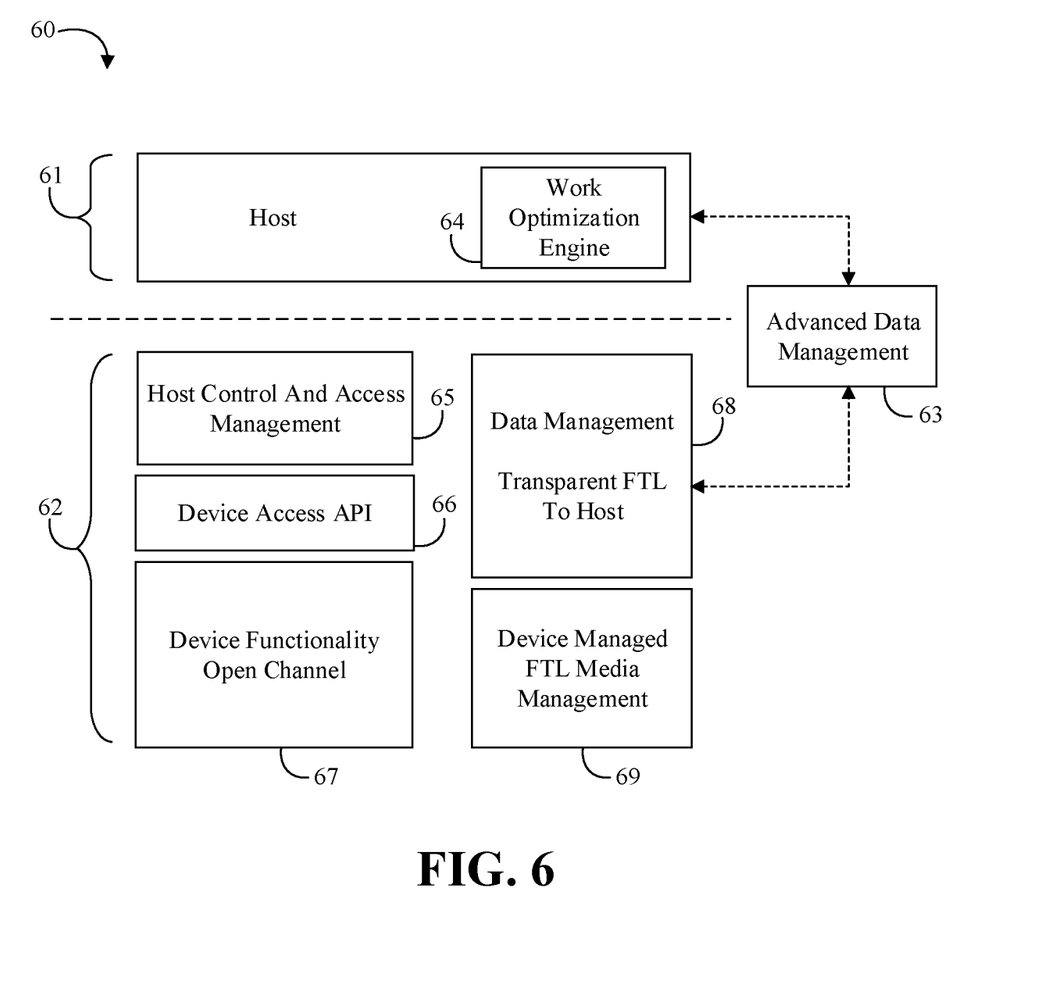
FIG. 6 is a block diagram of another example of an electronic processing system according to an embodiment.

Turning now to FIG. 6, an embodiment of an electronic processing system 60 may include a host portion 61, a storage device portion 62 (e.g., a SSD), and an advanced data management interface 63 communicatively coupled between the host portion 61 and the device portion 62. The host portion 61 may include a workload optimization engine 64. The device portion may include host control and access management technology 65, device access API technology 66, and device functionality open channel technology 67. The device portion 62 may further include data management technology 68, including a transparent FTL to the host, and device managed FTL media management technology 69. As illustrated in FIG. 6, the host portion 61 above the dashed line may include host driver and host application software which includes the work optimization engine 64 (e.g., including a data placement optimization engine). The engine 64 can make the decisions to achieve optimum performance utilizing the advanced data management interface 63.

The work optimization engine 64 may include a decision such as, for a sequential write intensive application with invalidation rate of 500 MB, no defrag bandwidth is required for this application. The device portion 62 may provide an option for optimal data placement (e.g., such as Group, parallel unit (PU), chunk and capacity) through the interface 63, and the host portion 61 can start data commands. For another application that is read intensive, the host portion 61 may choose to provide channel isolation from other applications. In case of any endurance management operation, the device portion 62 may provide a recommendation for data relocation requirements and options.

For example, the interface 63 may include technology for: 1) The host portion 61 to get a log page regarding current available placement options; 2) The device portion 62 to provide current options through log data; the host portion 61 can maintain this data and utilize the data for next placements to minimize management commands; 3) The host portion 61 to attach a namespace with attributes (e.g., workload type, expected bandwidth for host I/Os, expected bandwidth for defrag, etc.); 4) The device portion 62 to send an asynchronous event to the host portion 61, if more defrag bandwidth is needed; 5) The host data placement optimization engine (e.g. part of the engine 64) to query current invalidation tables and rate to optimize future data placement; 6) To utilize on the fly read and write isolations at the host portion 61 (e.g., because the host portion 61 can query physical data placements); 7) Make over provisioning needs visible to the host portion 61 and host level optimization may be performed; 8) The device portion 62 to share program/erase (P/E) cycles with the host portion 61 for optimum data placement decisions; and 9) The host portion 61 to define an indirection mode for a namespace or zone.

Figure 7:
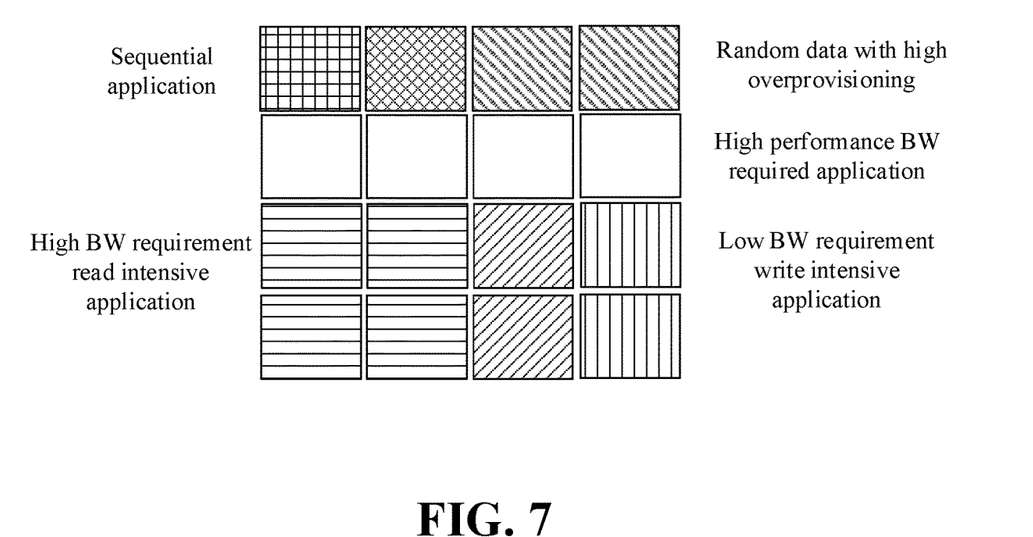
FIG. 7 is an illustrative diagram of an example of a mapping of applications to units of storage according to an embodiment.

Turning now to FIG. 7, an embodiment of an illustrative storage mapping shows an example of how different applications may be organized in a single storage device. Each block corresponds to an arbitrary unit of storage. For example, each block may correspond to a die or a group of die. As illustrated, a sequential application may be mapped to one unit of storage. An application including random data with high overprovisioning may be mapped to two units of storage. A high performance bandwidth required application may be mapped to four units of storage. A high bandwidth requirement, read intensive application may be mapped to four units of storage. A low bandwidth requirement, write intensive application may be mapped to two units of storage. Each of the applications may be logically and physically isolated from each other.

Advantageously, some embodiments include technology that allows the host to focus on application requirements and optimize the placements and bandwidths instead of managing the entire SSD. FIG. 7 shows an example of how the host can optimize different application requirements, with different types of applications mapped to a die or group of dies in a very flexible fashion.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
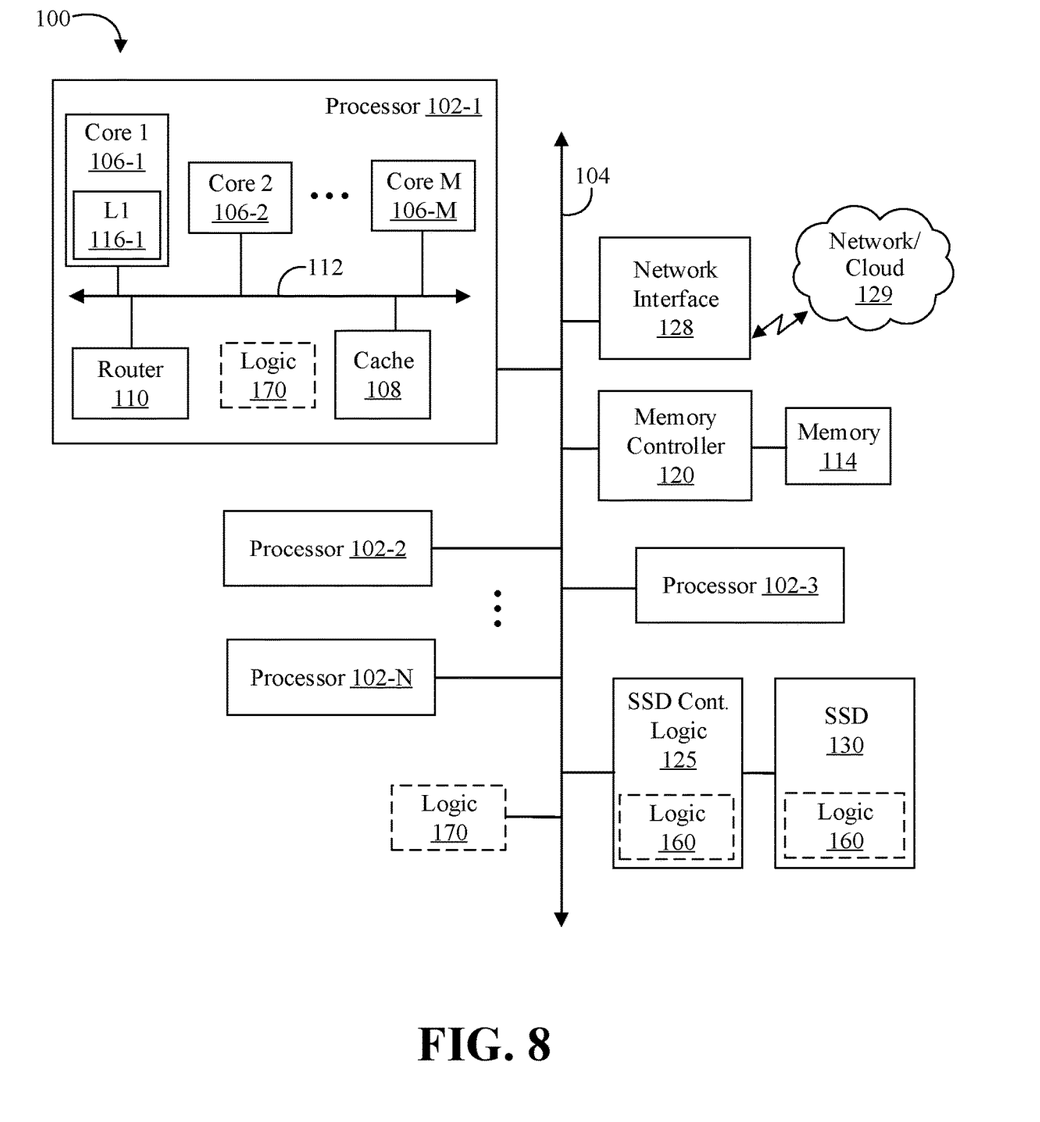
FIG. 8 is a block diagram of an example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a midlevel cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include Non-Volatile (NV) storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc. Additionally, logic 125 may be incorporated into memory controller logic (such as those discussed with reference to FIG. 9) or provided on a same integrated circuit (IC) device in various embodiments (e.g., on the same IC device as the SSD 130 or in the same enclosure as the SSD 130). The SSD 130 may be OCSSD-compatible, or may otherwise include technology to allow a host/tenant/application direct access to the NAND die and/or more fine-grained control of data placement.

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

As illustrated in FIG. 8, SSD 130 may include logic 160, which may be in the same enclosure as the SSD 130 and/or fully integrated on a printed circuit board (PCB) of the SSD 130. The system 100 may include further logic 170 outside of the SSD 130. Advantageously, the logic 160 and/or logic 170 may include technology to implement one or more aspects of the method 30 (FIGS. 3A to 3C), the system 50, the system 60, and/or any of the advanced data management features discussed herein. For example, the logic 160 may include technology to provide placement option information to the processors 102 in response to a query from the processors 102, and create a namespace to access the SSD 130 based on isolation granularity information provided by the processors 102. For example, the isolation granularity information may correspond to one of channel, die, or band isolation information. In some embodiments, the logic 160 may be further configured to communicate data placement information to the processors 102, set an indirection mode based on indirection granularity information for the namespace provided by the processors 102, communicate invalidity information to the processors 102, and/or communicate defragmentation bandwidth requirement information to the processors 102. For example, the logic 170 may include technology to implement the host device/computer system/agent aspects of the various embodiments described herein (e.g., requesting information from the SSD 130, communicating information to the SSD 130, etc.).

In other embodiments, the SSD 130 may be replaced with any suitable persistent storage technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of persistent storage media and may be considered a hybrid SSD. For example, the bulk of the storage may be NAND and the SSD may further include some faster, smaller granularity accessible (e.g., byte-addressable) NVM such as INTEL 3DXP media (e.g., which may be utilized to implement the transfer buffer). The SSD 130 may alternatively, or additionally, include persistent volatile memory (e.g., battery or capacitor backed-up DRAM or SRAM). For example, some SSDs may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the SSD. As shown in FIG. 8, features or aspects of the logic 160 and/or the logic 170 may be distributed throughout the system 100, and/or co-located/integrated with various components of the system 100.

Figure 9:
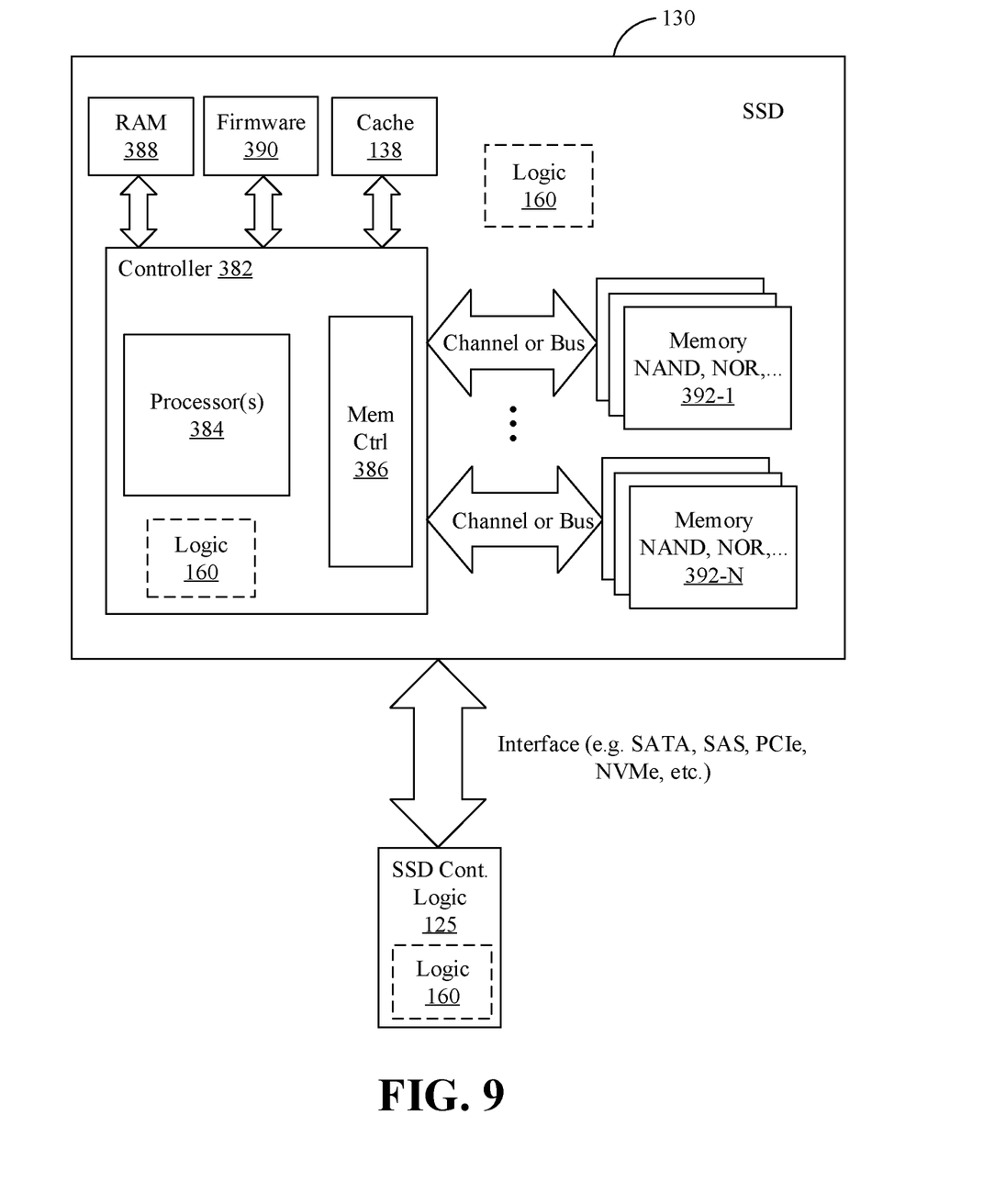
FIG. 9 is a block diagram of an example of a SSD according to an embodiment.

FIG. 9 illustrates a block diagram of various components of the SSD 130, according to an embodiment. As illustrated in FIG. 9, logic 160 may be located in various locations such as inside the SSD 130 or controller 382, etc., and may include similar technology as discussed in connection with FIG. 8. SSD 130 includes a controller 382 (which in turn includes one or more processor cores or processors 384 and memory controller logic 386), cache 138, RAM 388, firmware storage 390, and one or more memory modules or dies 392-1 to 392-N (which may include NAND flash, NOR flash, or other types of non-volatile memory). Memory modules 392-1 to 392-N are coupled to the memory controller logic 386 via one or more memory channels or busses. Also, SSD 130 communicates with logic 125 via an interface (such as a SATA, SAS, PCIe, NVMe, etc., interface). One or more of the features/aspects/operations discussed with reference to FIGS. 1-8 may be performed by one or more of the components of FIG. 9. Processors 384 and/or controller 382 may compress/decompress (or otherwise cause compression/decompression of) data written to or read from memory modules 392-1 to 392-N. Also, one or more of the features/aspects/operations of FIGS. 1-8 may be programmed into the firmware 390. Further, SSD controller logic 125 may also include logic 160.

ADDITIONAL NOTES AND EXAMPLES

Example 1 includes a semiconductor apparatus for use with a persistent storage media, comprising one or more substrates, and logic coupled to the one or more substrates, wherein the logic is at least partly implemented in one or more of configurable logic and fixed-functionality hardware logic, the logic coupled to the one or more substrates to provide placement option information to a host in response to a host query, and create a namespace to access a persistent storage media based on host-provided isolation granularity information.

Example 2 includes the apparatus of any of Examples 1 and 3 to 8, wherein the host-provided isolation granularity information corresponds to one of channel, die, or band isolation information.

Example 3 includes the apparatus of any of Examples 1 to 2 and 4 to 8, wherein the logic is further to communicate data placement information to the host.

Example 4 includes the apparatus of any of Examples 1 to 3 and 5 to 8, wherein the logic is further to set an indirection mode based on host-provided indirection granularity information for the namespace.

Example 5 includes the apparatus of any of Examples 1 to 4 and 6 to 8, wherein the logic is further to communicate invalidity information to the host.

Example 6 includes the apparatus of any of Examples 1 to 5 and 7 to 8, wherein the logic is further to communicate defragmentation bandwidth requirement information to the host.

Example 7 includes the apparatus of any of Examples 1 to 6 and 8, wherein the persistent storage media comprises NAND media.

Example 8 includes the apparatus of any of Examples 1 to 7, wherein the logic coupled to the one or more substrates includes transistor channel regions that are positioned within the one or more substrates.

Example 9 includes an electronic storage system, comprising persistent storage media, a controller communicatively coupled to the persistent storage media, and logic communicatively coupled to the controller to provide placement option information to a host in response to a host query, and create a namespace to access the persistent storage media based on host-provided isolation granularity information.

Example 10 includes the system of any of Examples 9 and 11 to 15, wherein the host-provided isolation granularity information corresponds to one of channel, die, or band isolation information.

Example 11 includes the system of any of Examples 9 to 10 and 12 to 15, wherein the logic is further to communicate data placement information to the host.

Example 12 includes the system of any of Examples 9 to 11 and 13 to 15, wherein the logic is further to set an indirection mode based on host-provided indirection granularity information for the namespace.

Example 13 includes the system of any of Examples 9 to 12 and 14 to 15, wherein the logic is further to communicate invalidity information to the host.

Example 14 includes the system of any of Examples 9 to 13 and 15, wherein the logic is further to communicate defragmentation bandwidth requirement information to the host.

Example 15 includes the system of any of Examples 9 to 14, wherein the persistent storage media comprises NAND media.

Example 16 includes a method of managing storage, comprising providing placement option information to a host in response to a host query, and creating a namespace to access a persistent storage media based on host-provided isolation granularity information.

Example 17 includes the method of any of Examples 16 and 18 to 22, wherein the host-provided isolation granularity information corresponds to one of channel, die, or band isolation information.

Example 18 includes the method of any of Examples 16 to 17 and 19 to 22, further comprising communicating data placement information to the host.

Example 19 includes the method any of Examples 16 to 18 and 20 to 22, further comprising setting an indirection mode based on host-provided indirection granularity information for the namespace.

Example 20 includes the method any of Examples 16 to 19 and 21 to 22, further comprising communicating invalidity information to the host.

Example 21 includes the method any of Examples 16 to 20 and 22, wherein the logic is further to communicating defragmentation bandwidth requirement information to the host.

Example 22 includes the method of any of Examples 16 to 21, wherein the persistent storage media comprises NAND media.

Example 23 includes at least one computer readable storage medium, comprising a set of instructions, which when executed by a computing device, cause the computing device to provide placement option information to a host in response to a host query, and create a namespace to access a persistent storage media based on host-provided isolation granularity information.

Example 24 includes the at least one computer readable storage medium of any of Examples 23 and 25 to 29, wherein the host-provided isolation granularity information corresponds to one of channel, die, or band isolation information.

Example 25 includes the at least one computer readable storage medium of any of Examples 23 to 24 and 26 to 29, comprising a further set of instructions, which when executed by the computing device, cause the computing device to communicate data placement information to the host.

Example 26 includes the at least one computer readable storage medium of any of Examples 23 to 25 and 27 to 29, comprising a further set of instructions, which when executed by the computing device, cause the computing device to set an indirection mode based on host-provided indirection granularity information for the namespace.

Example 27 includes the at least one computer readable storage medium of any of Examples 23 to 26 and 28 to 29, comprising a further set of instructions, which when executed by the computing device, cause the computing device to communicate invalidity information to the host.

Example 28 includes the at least one computer readable storage medium of any of Examples 23 to 27 and 29, comprising a further set of instructions, which when executed by the computing device, cause the computing device to communicate defragmentation bandwidth requirement information to the host.

Example 29 includes the at least one computer readable storage medium of any of Examples 23 to 28, wherein the persistent storage media comprises NAND media.

Example 30 includes a storage management apparatus, comprising means for providing placement option information to a host in response to a host query, and means for creating a namespace to access a persistent storage media based on host-provided isolation granularity information.

Example 31 includes the method of any of Examples 30 and 32 to 36, wherein the host-provided isolation granularity information corresponds to one of channel, die, or band isolation information.

Example 32 includes the method of any of Examples 30 to 31 and 33 to 36, further comprising means for communicating data placement information to the host.

Example 33 includes the method any of Examples 30 to 32 and 34 to 36, further comprising means for setting an indirection mode based on host-provided indirection granularity information for the namespace.

Example 34 includes the method any of Examples 30 to 33 and 35 to 36, further comprising means for communicating invalidity information to the host.

Example 35 includes the method any of Examples 30 to 34 and 36, wherein the logic is further to means for communicating defragmentation bandwidth requirement information to the host.

Example 36 includes the method of any of Examples 30 to 35, wherein the persistent storage media comprises NAND media.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with a persistent storage media, comprising:
   one or more substrates; and
   logic coupled to the one or more substrates, wherein the logic is at least partly implemented in one or more of configurable logic and fixed-functionality hardware logic, the logic coupled to the one or more substrates to:
   provide placement option information to a host in response to a host query, and
   create a namespace to access a persistent storage media based on host-provided granularity information, wherein the host-provided granularity information indicates a selection by the host of one of a channel isolation granularity, a die isolation granularity, or a band isolation granularity, and wherein the host-provided granularity information indicates a selection by the host of one of a die level indirection granularity, a band level indirection granularity, a 4K indirection granularity, or a 64K indirection granularity.

2. The semiconductor apparatus of claim 1, wherein the logic is further to:
   communicate data placement information to the host.

3. The semiconductor apparatus of claim 1, wherein the logic is further to:
   communicate invalidity information to the host.

4. The semiconductor apparatus of claim 1, wherein the logic is further to:
   communicate defragmentation bandwidth requirement information to the host.

5. The semiconductor apparatus of claim 1, wherein the persistent storage media comprises NAND media.

6. The semiconductor apparatus of claim 1, wherein the logic coupled to the one or more substrates includes transistor channel regions that are positioned within the one or more substrates.

7. An electronic storage system, comprising:
   persistent storage media;

a controller communicatively coupled to the persistent storage media; and logic communicatively coupled to the controller to:
provide placement option information to a host in response to a host query, and
create a namespace to access the persistent storage media based on host-provided granularity information, wherein the host-provided granularity information indicates a selection by the host of one of a channel isolation granularity, a die isolation granularity, or a band isolation granularity, and wherein the host-provided granularity information indicates a selection by the host of one of a die level indirection granularity, a band level indirection granularity, a 4K indirection granularity, or a 64K indirection granularity.

8. The electronic storage system of claim 7, wherein the logic is further to:
communicate data placement information to the host.

9. The electronic storage system of claim 7, wherein the logic is further to:
communicate invalidity information to the host.

10. The electronic storage system of claim 7, wherein the logic is further to:
communicate defragmentation bandwidth requirement information to the host.

11. A method of managing storage, comprising:
providing placement option information to a host in response to a host query, and
creating a namespace to access a persistent storage media based on host-provided granularity information, wherein the host-provided granularity information indicates a selection by the host of one of a channel isolation granularity, a die isolation granularity, or a band isolation granularity, and wherein the host-provided granularity information indicates a selection by the host of one of a die level indirection granularity, a band level indirection granularity, a 4K indirection granularity, or a 64K indirection granularity.

12. The method of claim 11, further comprising:
communicating data placement information to the host.

13. The method of claim 11, further comprising:
communicating invalidity information to the host.

14. The method of claim 11, further comprising:
communicating defragmentation bandwidth requirement information to the host.

* * * * *